(12) United States Patent
Shimada et al.

(10) Patent No.: US 8,378,646 B2
(45) Date of Patent: Feb. 19, 2013

(54) BIDIRECTIONAL DC-DC CONVERTER AND CONTROL METHOD THEREOF

(75) Inventors: Takae Shimada, Hitachi (JP); Kimiaki Taniguchi, Hadano (JP); Hiroyuki Shoji, Hitachi (JP)

(73) Assignee: Hitachi Computer Peripherals Co., Ltd., Kanagawa (JP)

( * ) Notice: Subject to any disclaimer, the term of this patent is extended or adjusted under 35 U.S.C. 154(b) by 279 days.

(21) Appl. No.: 12/544,107

(22) Filed: Aug. 19, 2009

(65) Prior Publication Data

US 2010/0052423 A1 Mar. 4, 2010

(30) Foreign Application Priority Data

Sep. 2, 2008 (JP) ................................. 2008-224231

(51) Int. Cl.
  *G05F 1/10* (2006.01)
(52) U.S. Cl. ............... 323/222; 363/37; 363/17; 307/66
(58) Field of Classification Search ............. 363/16–20, 363/37, 41, 127, 131, 132, 89, 98; 323/222, 323/272–275, 282–288; 307/64, 66, 46, 307/65, 10.01
See application file for complete search history.

(56) References Cited

U.S. PATENT DOCUMENTS

| | | | | |
|---|---|---|---|---|
| 5,066,900 A | * | 11/1991 | Bassett | 323/224 |
| 5,552,681 A | * | 9/1996 | Suzuki et al. | 318/139 |
| 5,633,577 A | * | 5/1997 | Matsumae et al. | 322/37 |
| 5,710,699 A | * | 1/1998 | King et al. | 363/132 |
| 6,282,103 B1 | * | 8/2001 | Naito et al. | 363/21.12 |
| 6,320,358 B2 | * | 11/2001 | Miller | 323/222 |
| 6,452,815 B1 | * | 9/2002 | Zhu et al. | 363/17 |
| 6,512,352 B2 | * | 1/2003 | Qian | 323/282 |
| 7,177,163 B2 | | 2/2007 | Eguchi et al. | |
| 7,557,546 B2 | * | 7/2009 | Uruno et al. | 323/259 |
| 7,612,602 B2 | * | 11/2009 | Yang et al. | 327/494 |
| 7,986,535 B2 | * | 7/2011 | Jacobson et al. | 363/17 |
| 2004/0066094 A1 | | 4/2004 | Suzuki et al. | |
| 2006/0139823 A1 | | 6/2006 | Shoji et al. | |

(Continued)

FOREIGN PATENT DOCUMENTS

| | | |
|---|---|---|
| CN | 1494190 A | 5/2004 |
| CN | 1988349 A | 6/2007 |

(Continued)

OTHER PUBLICATIONS

European Patent Office extended search report on application No. 09010449.8 dated Aug. 17, 2011; 5 pages.

*Primary Examiner* — Rajnikant Patel
(74) *Attorney, Agent, or Firm* — Foley & Lardner LLP (57) ABSTRACT

Disclosed is a small-size, high-efficiency, isolated, bidirectional DC-DC converter. The bidirectional DC-DC converter includes a transformer in which windings are magnetically coupled, switching circuits, a diode which is connected in parallel with a switch, smoothing capacitors, and a control section. First and second DC power supplies, which are connected in parallel with the smoothing capacitors, respectively, provide bidirectional electrical power transfer. When electrical power is to be transferred from the first DC power supply to the second DC power supply, the switch is maintained in the ON state. When, on the other hand, electrical power is to be transferred from the second DC power supply to the first DC power supply, the switch is maintained in the OFF state to prevent a reverse electrical power flow from the first DC power supply.

17 Claims, 8 Drawing Sheets

U.S. PATENT DOCUMENTS

| | | |
|---|---|---|
| 2007/0025125 A1 | 2/2007 | Nakahori et al. |
| 2008/0074905 A1 | 3/2008 | Moiseev et al. |
| 2010/0142228 A1 | 6/2010 | Yamauchi et al. |

FOREIGN PATENT DOCUMENTS

| | | |
|---|---|---|
| EP | 1 387 462 A2 | 2/2004 |
| EP | 1387462 * | 2/2004 |
| EP | 1 801 960 A2 | 6/2007 |
| EP | 1801960 * | 6/2007 |
| JP | 11-089232 | 3/1999 |
| JP | 2000-050402 | 2/2000 |
| JP | 2002-165448 A | 6/2002 |
| JP | 2003-164151 | 6/2003 |
| JP | 2004-140959 A | 5/2004 |
| JP | 2004-282828 A | 10/2004 |
| JP | 2006-187147 A | 7/2006 |
| JP | 2007-174784 | 7/2007 |
| JP | 2007-209084 | 8/2007 |
| JP | 2008-079454 | 4/2008 |

\* cited by examiner

BIDIRECTIONAL DC-DC CONVERTER AND CONTROL METHOD THEREOF

BACKGROUND OF THE INVENTION (1) Field of the Invention

The present invention relates to a bidirectional DC-DC converter having an isolation function. The present invention also relates to a method for controlling the bidirectional DC-DC converter.

(2) Description of the Related Art

In recent years, increased use of highly efficient hybrid vehicles is promoted due to a rising demand for global environment conservation. The hybrid vehicles have a main battery for driving a traction motor and an auxiliary battery for driving accessories. The degree of freedom in designing a vehicle power supply system can be increased when the two batteries, which differ in voltage, are flexibly used for effective electrical power distribution.

In view of the above circumstances, a bidirectional DC-DC converter disclosed in JP-A No. 2002-165448 provides bidirectional electrical power conversion between two power supplies that differ in voltage. This converter is configured so that a high-voltage circuit is connected to a low-voltage circuit through a transformer. Operating a switching device in the high-voltage circuit supplies electrical power from a high-voltage power supply to a low-voltage power supply. Operating a switching device in the low-voltage circuit supplies electrical power from the low-voltage power supply to the high-voltage power supply.

A bidirectional DC-DC converter disclosed in JP-A No. 2006-187147 is configured so that a low-voltage circuit is connected to a voltage clamp circuit, which includes a series connection between a switching device and a capacitor. This converter uses the voltage clamp circuit to reduce a circulating-current-induced loss during a voltage decrease. Further, this converter makes it possible to decrease the dielectric strength of the switching device by suppressing the occurrence of a surge voltage in the low-voltage circuit during a voltage increase/decrease, and serves as a highly efficient, small-size, bidirectional DC-DC converter.

A bidirectional DC-DC converter disclosed in JP-A No. 2004-282828 is configured so that an LC resonant circuit is connected in series with a transformer winding. This converter exhibits low switching loss, makes it possible to eliminate the possibility of a large current flowing to a switching device upon power on/off, and serves as a bidirectional DC-DC converter that efficiently provides flexible electrical power distribution between two DC power supply systems through the use of a simple control scheme.

SUMMARY OF THE INVENTION

In general, downsizing and efficiency improvement of a bidirectional DC-DC converter can be effectively accomplished by using a switching device that exhibits fast switching characteristics. However, even when a high-voltage MOSFET is used as the switching device in order to transfer electrical power to and from a high-voltage DC power supply and achieve downsizing and efficiency improvement of the aforementioned previously disclosed bidirectional DC-DC converters, such downsizing and efficiency improvement are obstructed because the body diode reverse recovery characteristics of the MOSFET are slower than the switching characteristics of the MOSFET.

An object of the present invention is to provide a small-size, high-efficiency, bidirectional DC-DC converter that permits the use of a high-voltage MOSFET or other switching device having fast switching characteristics and relatively slow body diode reverse recovery characteristics, exhibits low switching loss, and reduces the influence of relatively slow body diode reverse recovery characteristics. Another object of the present invention is to provide a method for controlling such a bidirectional DC-DC converter.

In accomplishing the above objects, according to a first aspect of the present invention, there is provided a bidirectional DC-DC converter including: a first smoothing capacitor which is connected in parallel with a first DC power supply and connected between DC terminals of a first switching circuit; a second smoothing capacitor which is connected in parallel with a second DC power supply and connected between DC terminals of a second switching circuit; a primary winding which is connected between AC terminals of the first switching circuit; a secondary winding which is connected between AC terminals of the second switching circuit; a transformer which magnetically couples the primary winding to the secondary winding; a control section which controls the first and the second switching circuits so as to transfer electrical power between the first and the second DC power supplies; a first diode which is inserted in series between the first DC power supply, the first smoothing capacitor, and the DC terminals of the first switching circuit to ensure that a cathode faces a positive electrode of the first DC power supply; and a first switch which is connected in parallel with the first diode; wherein the control section turns on the first switch when supplying electrical power from the first DC power supply to the second DC power supply and turns off the first switch when supplying electrical power from the second DC power supply to the first DC power supply.

According to a second aspect of the present invention, there is provided the bidirectional DC-DC converter further including a resonant reactor which is inserted in series with the primary winding and/or the secondary winding.

According to a third aspect of the present invention, there is provided the bidirectional DC-DC converter further including a resonant capacitor which is inserted in series with the primary winding and/or the secondary winding.

According to a fourth aspect of the present invention, there is provided the bidirectional DC-DC converter, wherein the first switching circuit includes: a first switching leg which is connected in series with a first and a second switching device; and a second switching leg which is connected in series with a third and a fourth switching device and connected in parallel with the first switching leg, wherein both ends of the first switching leg are a pair of DC terminals, and wherein a series connection point between the first and the second switching devices and a series connection point between the third and the fourth switching devices are a pair of AC terminals.

According to a fifth aspect of the present invention, there is provided the bidirectional DC-DC converter, wherein the third and the fourth switching devices are replaced with a first capacitor and a second capacitor, respectively.

According to a sixth aspect of the present invention, there is provided the bidirectional DC-DC converter, wherein the primary winding includes a connection between one end of a first primary winding and one end of a second primary winding; wherein the first switching circuit includes a first and a second switching device; wherein the other end of the first primary winding is connected to one end of the first switching device; wherein the other end of the second primary winding is connected to one end of the second switching device; wherein the other end of the first switching device is connected to the other end of the second switching device; and wherein a connection point between the first and the second switching devices and a connection point between the first and the second primary windings are a pair of DC terminals.

According to a seventh aspect of the present invention, there is provided the bidirectional DC-DC converter, wherein the second switching circuit includes a smoothing reactor, a third switching leg which is connected in series with a fifth and a sixth switching device, and a fourth switching leg which is connected in series with a seventh and an eighth switching device and connected in parallel with the third switching leg; wherein one end of the smoothing reactor is connected to one end of the third switching leg; wherein the other end of the smoothing reactor and the other end of the third switching leg are a pair of DC terminals; and wherein a series connection point between the fifth and the sixth switching devices and a series connection point between the seventh and the eighth switching devices are a pair of AC terminals.

According to an eighth aspect of the present invention, there is provided the bidirectional DC-DC converter, wherein the secondary winding includes a connection between one end of a first secondary winding and one end of a second secondary winding; wherein the second switching circuit includes a smoothing reactor, a fifth switching device, and a sixth switching device; wherein the other end of the first secondary winding is connected to one end of the fifth switching device; wherein the other end of the second secondary winding is connected to one end of the sixth switching device; wherein the other end of the fifth switching device is connected to the other end of the sixth switching device; wherein one end of the smoothing reactor is connected to a connection point between the first and the second secondary windings; and wherein the other end of the smoothing reactor and a connection point between the fifth and the sixth switching devices are a pair of DC terminals.

According to a ninth aspect of the present invention, there is provided the bidirectional DC-DC converter, wherein the second switching circuit includes a connection between one end of a first smoothing reactor and one end of a second smoothing reactor, and a connection between one end of a fifth switching device and one end of a sixth switching device; wherein the other end of the fifth switching device is connected to the other end of the first smoothing reactor; wherein the other end of the sixth switching device is connected to the other end of the second smoothing reactor; wherein the other end of the fifth switching device and the other end of the sixth switching device are a pair of AC terminals; and wherein a connection point between the first and the second smoothing reactors and a connection point between the fifth and the sixth switching devices are a pair of DC terminals.

According to a tenth aspect of the present invention, there is provided the bidirectional DC-DC converter further including: a second diode which is inserted in series between the second DC power supply, the second smoothing capacitor, and the DC terminals of the second switching circuit to ensure that a cathode faces a positive electrode of the second DC power supply; and a second switch which is connected in parallel with the second diode; wherein the control section turns on the second switch when supplying electrical power from the second DC power supply to the first DC power supply and turns off the second switch when supplying electrical power from the first DC power supply to the second DC power supply.

According to an eleventh aspect of the present invention, there is provided the bidirectional DC-DC converter, wherein the second switching circuit includes a third switching leg, which is connected in series with a fifth and a sixth switching device, and a fourth switching leg, which is connected in series with a seventh and an eighth switching device and connected in parallel with the third switching leg; wherein both ends of the third switching leg are a pair of DC terminals; and wherein a series connection point between the fifth and the sixth switching devices and a series connection point between the seventh and the eighth switching devices are a pair of AC terminals.

According to a twelfth aspect of the present invention, there is provided the bidirectional DC-DC converter, wherein the seventh and the eighth switching devices are replaced with a third capacitor and a fourth capacitor, respectively.

According to a thirteenth aspect of the present invention, there is provided the bidirectional DC-DC converter, wherein the secondary winding includes a connection between one end of a first secondary winding and one end of a second secondary winding; wherein the second switching circuit includes a fifth and a sixth switching device; wherein the other end of the first secondary winding is connected to one end of the fifth switching device; wherein the other end of the second secondary winding is connected to one end of the sixth switching device; wherein the other end of the fifth switching device is connected to the other end of the sixth switching device; and wherein a connection point between the fifth and the sixth switching devices and a connection point between the first and the second secondary windings are a pair of DC terminals.

According to a fourteenth aspect of the present invention, there is provided the bidirectional DC-DC converter, wherein the first and the second switches are electromagnetic relays.

According to a fifteenth aspect of the present invention, there is provided the bidirectional DC-DC converter, wherein the first to the eighth switching devices are MOSFETs.

According to a sixteenth aspect of the present invention, there is provided the bidirectional DC-DC converter, wherein the first and the second diodes exhibit faster reverse recovery characteristics than body diodes and/or antiparallel diodes of the first to the eighth switching devices.

In accomplishing the above objects, according to a seventeenth aspect of the present invention, there is provided a method for controlling a bidirectional DC-DC converter comprising: a first switching circuit connected in parallel with a first DC power supply; a second switching circuit connected in parallel with a second DC power supply; a primary winding connected between AC terminals of the first switching circuit; a secondary winding connected between AC terminals of the second switching circuit; a transformer for magnetically coupling the primary winding to the secondary winding; and a control section for controlling the first and the second switching circuits so as to transfer electrical power between the first and the second DC power supplies, the method including the steps of: inserting a first rectifying device in series between the first DC power supply and DC terminals of the first switching circuit to ensure that the direction of rectification is oriented toward a positive electrode of the first DC power supply; and connecting a first switch in parallel with the first rectifying device; wherein the control section turns on the first switch when supplying electrical power from the first DC power supply to the second DC power supply and turns off the first switch when supplying electrical power from the second DC power supply to the first DC power supply.

The present invention makes it possible to provide a small-size, high-efficiency, bidirectional DC-DC converter that permits the use of a high-voltage MOSFET or other switching device having fast switching characteristics and relatively slow body diode reverse recovery characteristics, exhibits low switching loss, and reduces the influence of relatively slow body diode reverse recovery characteristics.

BRIEF DESCRIPTION OF THE DRAWINGS

Embodiment of the present invention will be described in detail based on the following figures, wherein.

DETAILED DESCRIPTION OF THE PREFERRED EMBODIMENTS

Embodiments of the present invention will now be described in detail with reference to the accompanying drawings.

In this document, electrical power transmission from a DC power supply V1 to a DC power supply V2 is referred to as forward power transmission, whereas electrical power transmission from the DC power supply V2 to the DC power supply V1 is referred to as backward power transmission. Further, the voltage of a switching device in the ON state or a voltage equivalent to or lower than a forward dropped voltage of a diode is referred to as the zero voltage. Moreover, reducing switching loss by changing the state of a switching device between ON and OFF while the zero voltage is applied to the switching device is referred to as zero-voltage switching.

First Embodiment

Figure 1:
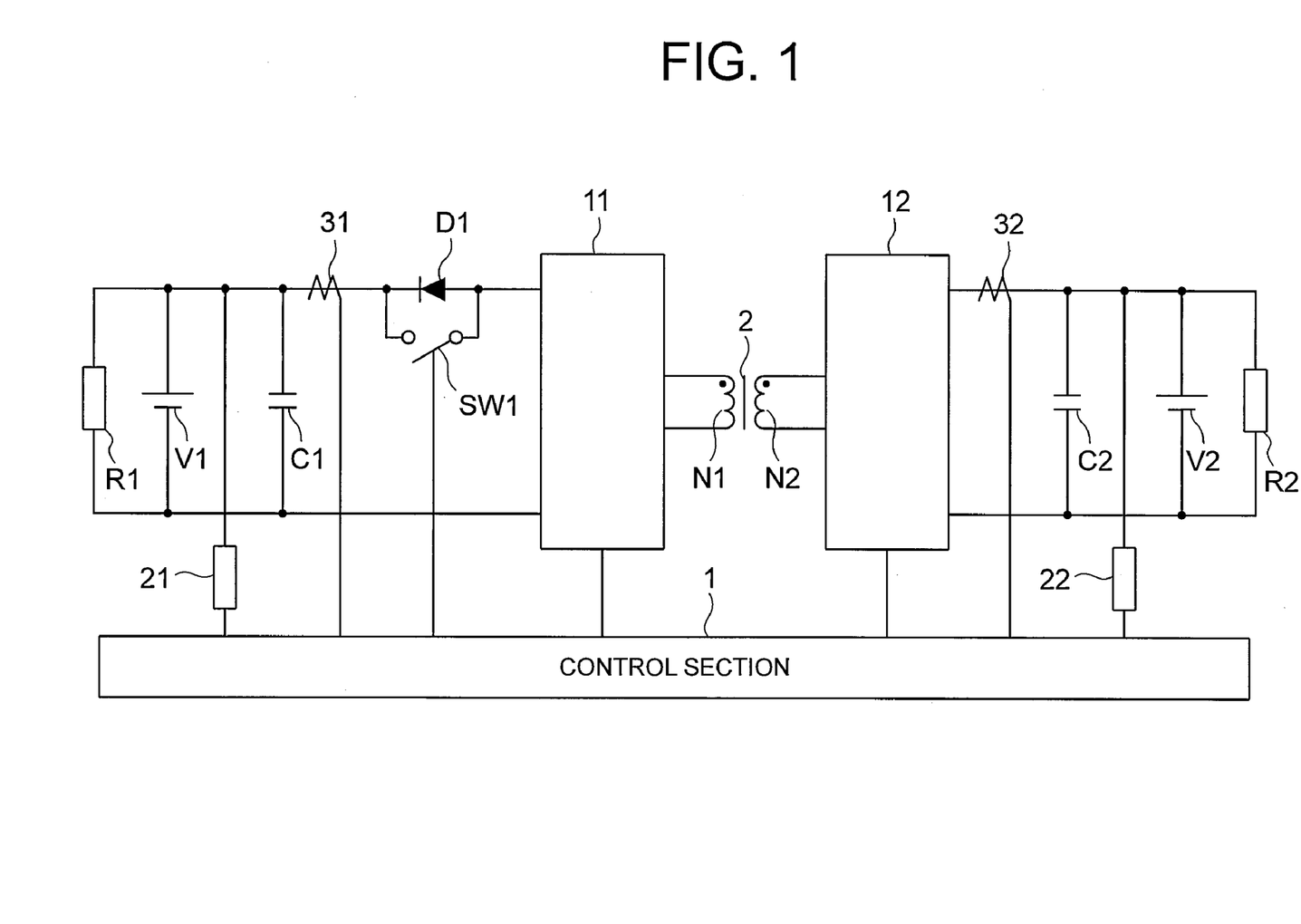
FIG. 1 is a schematic circuit diagram of a bidirectional DC-DC converter according to a first embodiment of the present invention.

FIG. 1 is a schematic circuit diagram of a bidirectional DC-DC converter according to a first embodiment of the present invention. The bidirectional DC-DC converter is connected between the DC power supply V1 and the DC power supply V2 to transfer electrical power between the DC power supply V1 and the DC power supply V2. A load R1 is connected to the DC power supply V1, whereas a load R2 is connected to the DC power supply V2.

Referring to FIG. 1, a smoothing capacitor C1 is connected to the DC power supply V1, whereas a smoothing capacitor C2 is connected to the DC power supply V2. The DC terminals of a switching circuit 11 are connected to the smoothing capacitor C1 through a diode D1. The connection of this diode D1 is oriented so that electrical power flows from the switching circuit 11 to the DC power supply V1 and does not flow from the DC power supply V1 to the switching circuit 11. A switch SW1 is connected in parallel with the diode D1. Further, the DC terminals of a switching circuit 12 are connected to the smoothing capacitor C2.

A winding N1 is connected to the AC terminals of the switching circuit 11. A winding N2 is connected to the AC terminals of the switching circuit 12. A transformer 2 magnetically couples the winding N1 to the winding N2.

The switching circuit 11, switching circuit 12, and switch SW1 are controlled by a control section 1. The control section 1 is connected to voltage sensors 21, 22 and current sensors 31, 32.

An operation that the bidirectional DC-DC converter according to the first embodiment performs for forward power transmission will now be described. The control section 1 maintains the switch SW1 in the ON state and applies an AC voltage to the winding N1 by allowing the switching circuit 11 to perform a switching operation. The switching circuit 12 rectifies a voltage induced across the winding N2 and supplies electrical power to the DC power supply V2.

As described above, the switch SW1 is maintained in the ON state during forward power transmission. As this forms a short circuit across the diode D1, the DC terminals of the switching circuit 11 are in the same state as when they are directly connected to the smoothing capacitor C1, bypassing the diode D1. The resulting circuit configuration is equivalent to the circuit configuration described in JP-A No. 2002-165448, JP-A No. 2006-187147, and JP-A No. 2004-282828. Therefore, the switching operation can be performed in the same manner as described in JP-A No. 2002-165448, JP-A No. 2006-187147, and JP-A No. 2004-282828.

Next, an operation that the bidirectional DC-DC converter according to the first embodiment performs for backward power transmission will now be described. The control section 1 maintains the switch SW1 in the OFF state and applies an AC voltage to the winding N2 by allowing the switching circuit 12 to perform a switching operation. The switching circuit 11 rectifies a voltage induced across the winding N1 and supplies electrical power to the DC power supply V1.

As described above, when backward power transmission occurs, the switching circuit 11 functions as a rectifier circuit with the switch SW1 maintained in the OFF state. In this instance, even if a body diode of a high-voltage MOSFET or other device exhibiting relatively slow reverse recovery characteristics is used as a rectifying device constituting the switching circuit 11, the diode D1, which exhibits relatively fast reverse recovery characteristics, prevents a reverse electrical power flow from the DC power supply V1 and smoothing capacitor C1 to the switching circuit 11. This enables the bidirectional DC-DC converter according to the present invention to achieve backward power transmission with high efficiency. When a conventional circuit configuration, which does not include the diode D1, is employed, it is readily understood that effective backward power transmission is obstructed because electrical power flows in the reverse direction from the DC power supply V1 and smoothing capacitor C1 to the switching circuit 11 during a reverse conduction period of the rectifying device.

The above-mentioned problem can also be solved by using an IGBT with an antiparallel diode as a switching/rectifying device for the switching circuit 11 instead of using the above-described embodiment. However, the IGBT suffers an increase in the switching loss and a decrease in the efficiency of forward power transmission because it exhibits slower switching characteristics than a high-voltage MOSFET. Further, if a switching frequency is decreased to reduce the switching loss, it is necessary to increase the sizes of the transformer 2 and smoothing capacitors C1, C2. This will result in an increase of the cubic volume of the bidirectional DC-DC converter.

Another method of solving the above-mentioned problem without using the present invention is to use a reverse-blocking MOSFET with an antiparallel diode as a switching/rectifying device for the switching circuit 11. However, the use of this method will increase the cost and the cubic volume due to an increase in the number of parts.

Meanwhile, the switch SW1 in the bidirectional DC-DC converter according to the present invention changes its state between ON and OFF only when a switch is made to initiate forward power transmission or backward power transmission. Therefore, the bidirectional DC-DC converter according to the present invention can use an IGBT, which operates at a relatively low speed, or a mechanical switch such as an electromagnetic relay. If an IGBT package with a built-in antiparallel diode is used when the use of an IGBT is demanded, it is not necessary to use the diode D1 as an external device, thereby making it easy to reduce the size of the bidirectional DC-DC converter. Further, if the mechanical switch is used, it makes it possible to achieve forward power transmission with increased efficiency because it exhibits low conduction loss.

Second Embodiment

Figure 2:
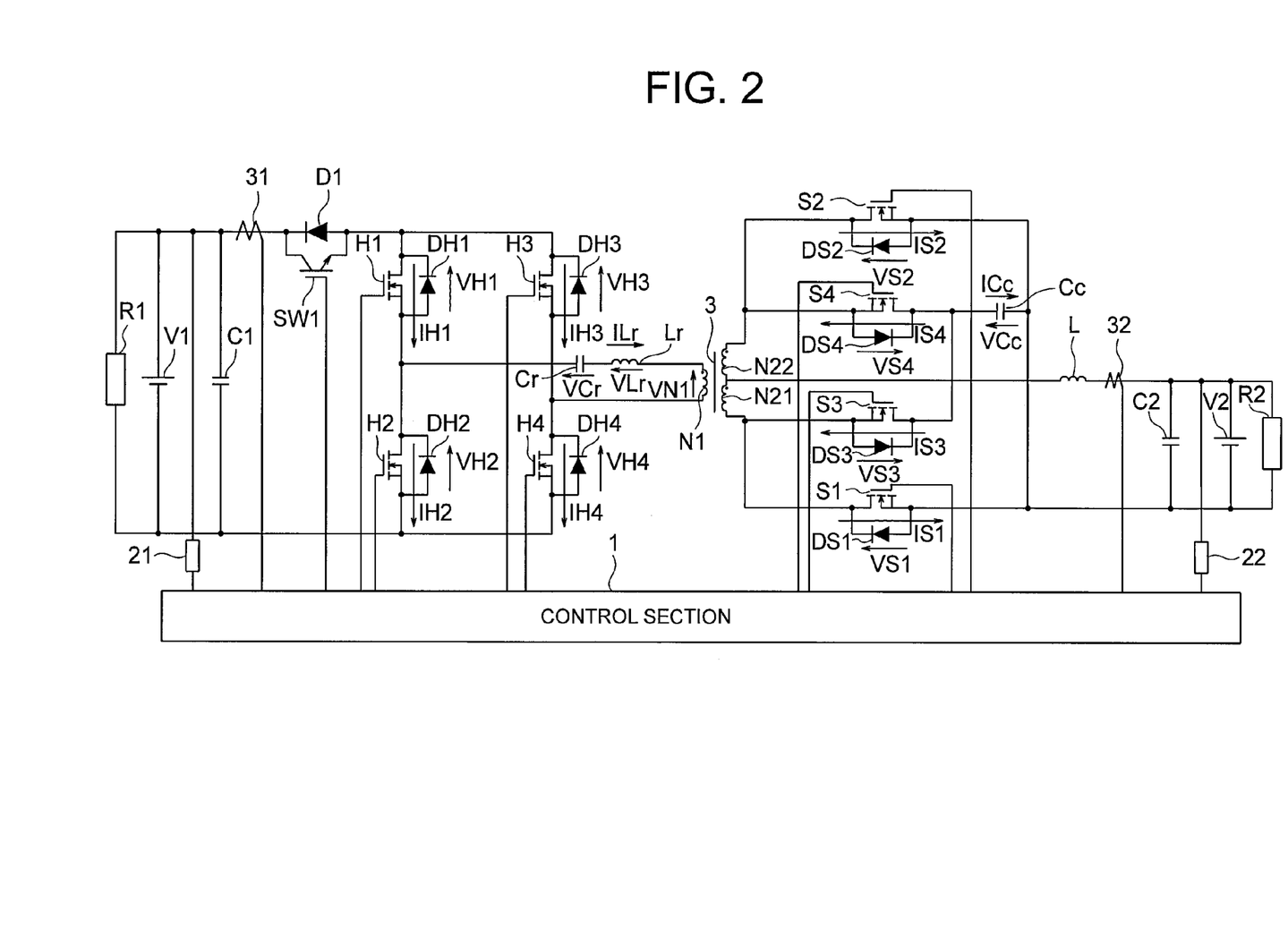
FIG. 2 is a schematic circuit diagram of a bidirectional DC-DC converter according to a second embodiment of the present invention.

FIG. 2 is a schematic circuit diagram of a bidirectional DC-DC converter according to a second embodiment of the present invention. The bidirectional DC-DC converter transfers electrical power between a DC power supply V1 and a DC power supply V2, which are connected to opposite ends of the bidirectional DC-DC converter. A load R1 is connected to the DC power supply V1, whereas a load R2 is connected to the DC power supply V2.

Referring to FIG. 2, a smoothing capacitor C1 is connected to the DC power supply V1, whereas a smoothing capacitor C2 is connected to the DC power supply V2. Switching devices H1, H2 are connected in series with a first switching leg. The first switching leg is connected to the smoothing capacitor C1 through a diode D1. The connection of this diode D1 is oriented so that electrical power flows from the first switching leg to the DC power supply V1 and does not flow from the DC power supply V1 to the first switching leg. A switch SW1 is connected in parallel with the diode D1. Switching devices H3, H4 are connected in series with a second switching leg. The second switching leg is connected in parallel with the first switching leg. A winding N1, a resonant reactor Lr, and a resonant capacitor Cr are connected in series between a series connection point of the switching devices H1 and H2 and a series connection point of the switching devices H3 and H4.

A transformer 3 magnetically couples windings N1, N21, and N22. One end of the winding N21 is connected to one end of the winding N22. The other end of the winding N21 is connected to one end of a switching device S1. The other end of the winding N22 is connected to one end of a switching device S2. The other end of the switching device S1 and the other end of the switching device S2 are connected to one end of the smoothing capacitor C2. A connection point between the winding N21 and the winding N22 is connected to the other end of the smoothing capacitor C2 through a smoothing reactor L.

A voltage clamp circuit, which is formed by connecting one end each of the switching device S3, switching device S4, and clamp capacitor Cc, is configured by connecting the other end of the switching device S3 to one end of the switching device S1, connecting the other end of the switching device S4 to one end of the switching device S2, and connecting the other end of the clamp capacitor Cc to the other ends of the switching device S1 and switching device S2.

Antiparallel diodes DH1-DH4, DS1-DS4 are connected to the switching devices H1-H4, S1-S4, respectively. If MOS-FETs are used as these switching devices, MOSFET body diodes can be used as the antiparallel diodes.

The switching devices H1-H4, S1-S4 and switch SW1 are controlled by a control section 1. The control section 1 is connected to voltage sensors 21, 22 and current sensors 31, 32.

[Forward Power Transmission from V1 to V2]

Figure 3:
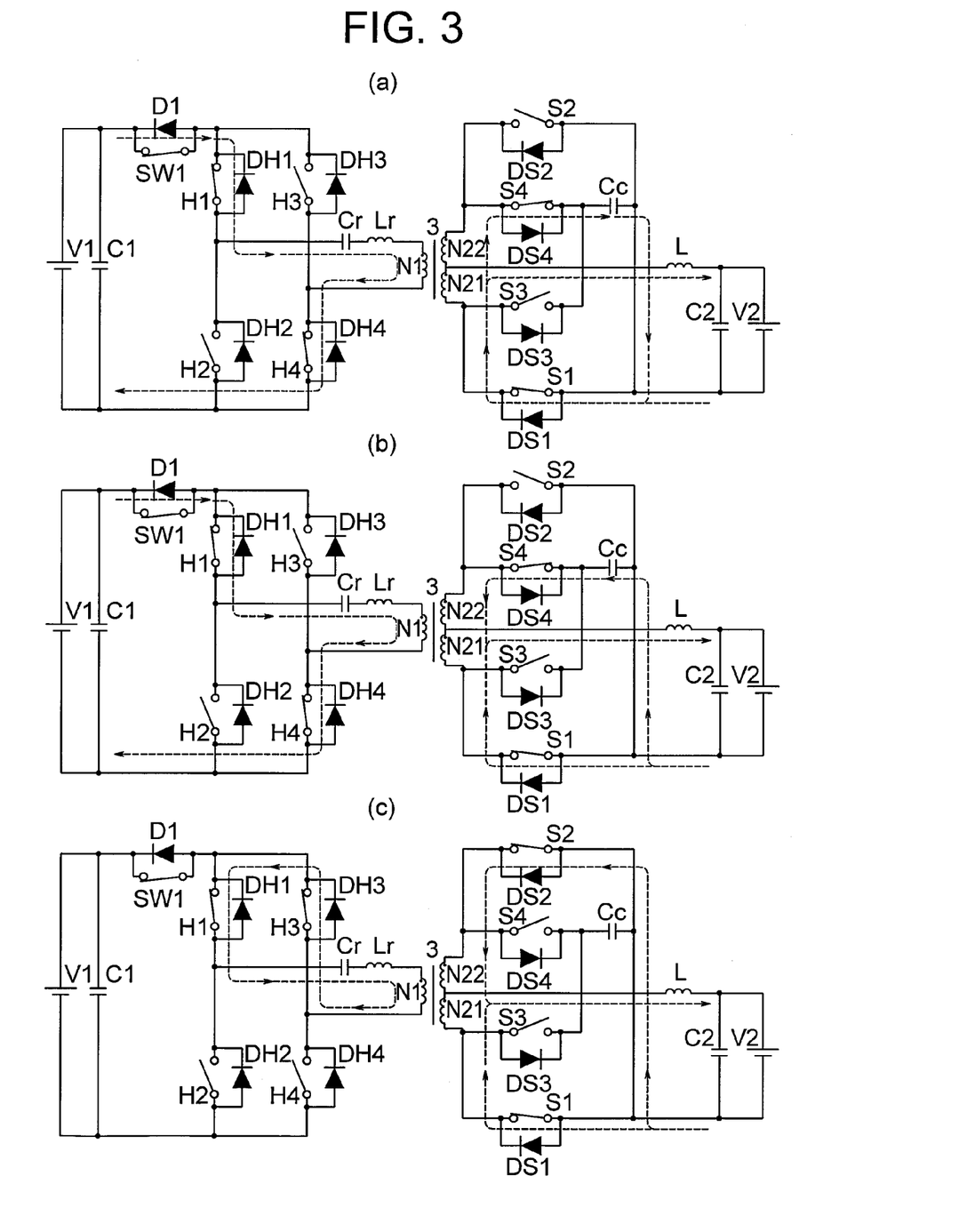
FIG. 3 is circuit diagram illustrating how the bidirectional DC-DC converter according to the second embodiment achieves forward power transmission.

FIG. 3 shows circuit diagrams (a) to (f) illustrating how the bidirectional DC-DC converter according to the second embodiment achieves forward power transmission. Forward power transmission operations will now be described in detail with reference to FIG. 3. In FIG. 3, (a) to (f) depict modes a to f, respectively.

(Mode a)

In mode a, the switch SW1 and switching devices H1 and H4 are ON, whereas the switching devices H2 and H3 are OFF. The voltage of the DC power supply V1 is applied to the winding N1 through the switch SW1, switching devices H1 and H4, resonant capacitor Cr, and resonant reactor Lr.

The switching devices S2 and S3 are OFF so that a voltage developed across the winding N21 is applied to the DC power supply V2 through the diode DS1 and smoothing reactor L. Consequently, energy is supplied to the DC power supply V2. Further, a voltage developed across the windings N21 and N22 is applied to the clamp capacitor Cc through the diodes DS1 and DS4. Consequently, the clamp capacitor Cc is charged.

If MOSFETs are used as the switching devices S1-S4, the loss may be reduced by shunting the current in the diodes DS1 and DS4 to the switching devices S1, S4 while the switching devices S1 and S4 are ON. Reducing the loss by turning ON a MOSFET in a situation where a diode's forward current flows to a diode antiparallelly connected to the MOSFET or a body diode of the MOSFET is hereinafter referred to as synchronous rectification. In this instance, the switching device S4 is turned ON (zero-voltage switching).

(Mode b)

The charging current for the clamp capacitor Cc decreases, and before long, the clamp capacitor Cc changes into a discharge state. The current discharged from the clamp capacitor Cc is supplied to the DC power supply V2 through the switching device S4, winding N22, and smoothing reactor L.

(Mode c)

When the switching device H4 is turned OFF, the current in the switching device H4 flows to a diode DH3, switching device H1, resonant capacitor Cr, resonant reactor Lr, and winding N1. In this instance, the switching device H3 is turned ON (zero-voltage switching).

When the switching device S4 is turned OFF, the discharge of the clamp capacitor Cc terminates so that the current in the switching device S4 is diverted to the diode DS2. If the switching device S2 turns ON in this instance, synchronous rectification occurs. The energy stored in the smoothing reactor L is supplied to the DC power supply V2.

(Mode d)

When the switching device H1 is turned OFF, the current in the switching device H1 flows in the switch SW1 and/or diode D1, DC power supply V1, diode DH2, resonant capacitor Cr, resonant reactor Lr, winding N1, and diode DH3. In this instance, the switching device H2 is turned ON (zero-voltage switching). The voltage of the DC power supply V1 is applied to the resonant reactor Lr so that the current decreases.

(Mode e)

The switching devices H2 and H3 are ON. Therefore, after the current in the resonant reactor Lr is reduced to zero, the current increases inversely. This decreases the current in the diode DS1 and winding N21 and increases the current in the diode DS2 and winding N22. The switching device S1 is turned OFF before the current in the winding N21 is reduced to zero.

(Mode f)

When the current in the winding N21 is reduced to zero, the diode DS1 goes into reverse conduction, and then achieves reverse recovery. Upon reverse recovery, the current flowing during such reverse conduction is diverted to the diode DS3. In this instance, the switching device S3 is turned ON (zero-voltage switching). Further, the voltage of the DC power supply V1 is applied to the winding N1.

The switching devices S1 and S4 are OFF so that a voltage developed across the winding N22 is applied to the DC power supply V2 through the diode DS2 and smoothing reactor L. Consequently, energy is supplied to the DC power supply V2. Further, a voltage developed across the windings N21 and N22 is applied to the clamp capacitor Cc through the diodes DS2 and DS3. Consequently, the clamp capacitor Cc is charged.

The operation performed in mode f is symmetrical to the operation performed in mode a. Subsequently, the bidirectional DC-DC converter performs symmetrical operations in modes b to e, and then reverts to mode a. As such operations can be readily understood, no further detailed description will be given here.

[Backward Power Transmission from V2 to V1]

Figure 4:
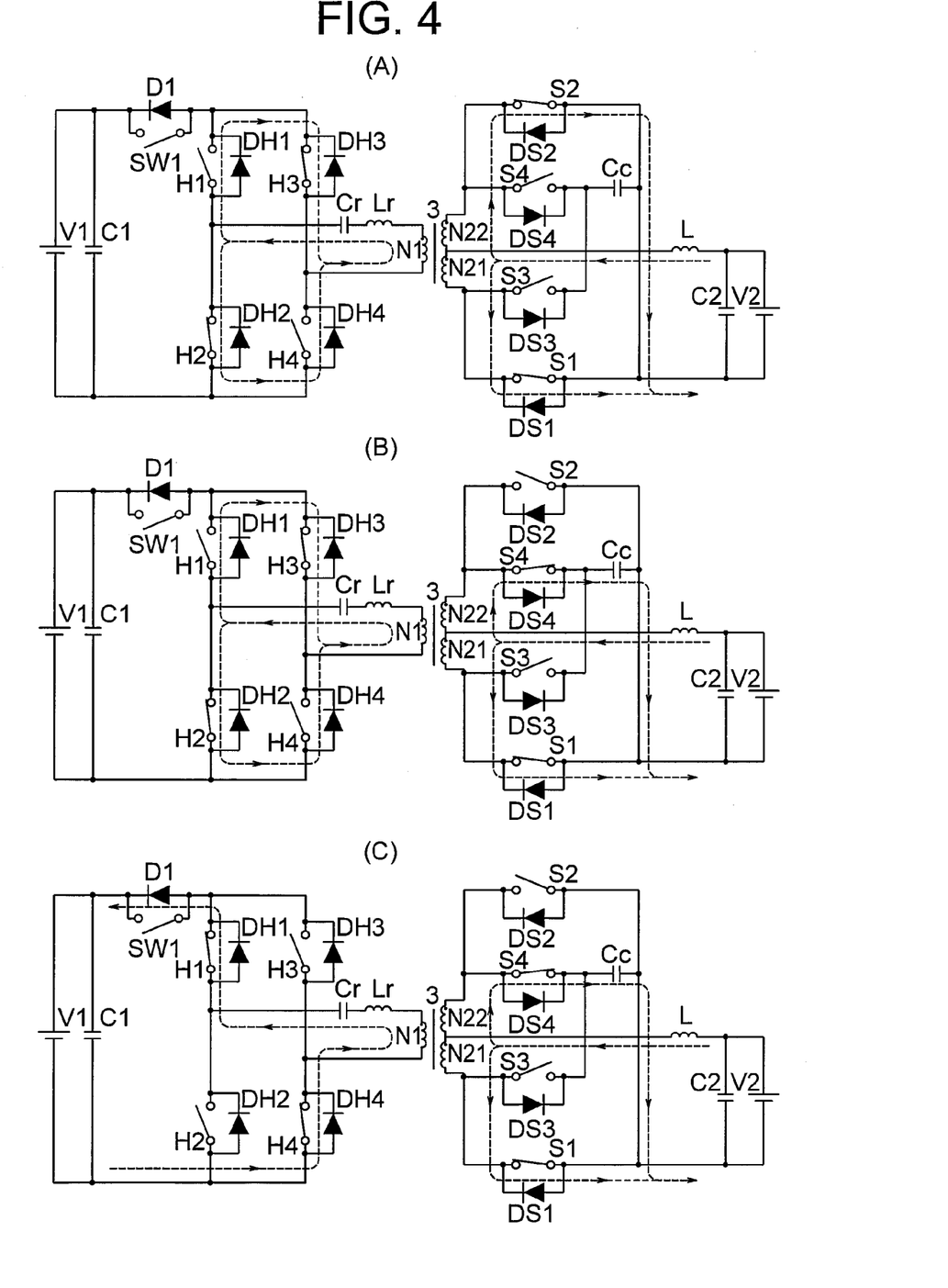
FIG. 4 is circuit diagram illustrating how the bidirectional DC-DC converter according to the second embodiment achieves backward power transmission.

FIG. 4 shows circuit diagrams (A) to (H) illustrating how the bidirectional DC-DC converter according to the second embodiment achieves backward power transmission. Backward power transmission operations will now be described in detail with reference to FIG. 4. In FIG. 4, (A) to (H) depict modes A to H, respectively.

(Mode A)

In mode A, the switching devices S1 and S2 are ON, whereas the switching devices S3 and S4 are OFF. The voltage of the DC power supply V2 is applied to the smoothing reactor L through the windings N21 and N22, and switching devices S1 and S2, so that the smoothing reactor L stores the energy of the DC power supply V2.

Further, the switch SW1 and switching devices H1 and H4 are OFF, whereas the switching devices H2 and H3 are ON. The current in the resonant capacitor Cr, diodes DH1 and DH4, switching devices H2 and H3, and winding N1 flows to the resonant reactor Lr. If, in this instance, MOSFETs are used as the switching devices H1-H4, synchronous rectification occurs when the switching devices H1 and H4 are turned ON.

(Mode B)

When the switching device S2 is turned OFF, the current in the switching device S2 flows in the diode DS4 to charge the clamp capacitor Cc. In this instance, the switching device S4 is turned ON (zero-voltage switching).

The voltage of the clamp capacitor Cc is applied to the windings N21 and N22 to develop a voltage across the winding N1. The voltage developed across the winding N1 is applied to the resonant reactor Lr to increase the current in the resonant reactor Lr.

Further, the energy stored in the smoothing reactor L is released.

(Mode C)

When the switching devices H2 and H3 are turned OFF, the current in the switching devices H2 and H3 flows to the DC power supply V1 through the diode DH4, winding N1, resonant reactor Lr, resonant capacitor Cr, diode DH1, and diode D1, thereby supply energy to the DC power supply V1. In this instance, the switching devices H1 and H4 are turned ON (zero-voltage switching).

(Mode D)

The charging current for the clamp capacitor Cc decreases in accordance with an increase in the current in the resonant reactor Lr. Before long, the clamp capacitor Cc changes into a discharge state.

(Mode E)

When the switching device S4 is turned OFF, the current discharged from the clamp capacitor Cc, which was flowing to the switching device S4, flows in the diode DS2. In this instance, the switching device S2 is turned ON (zero-voltage switching).

As the voltage VCc of the clamp capacitor Cc is no longer applied to the windings N21 and N22, no voltage is developed across the winding N1. Therefore, the voltage of the DC power supply V1 is applied to the resonant reactor Lr. This decreases the current in the resonant reactor Lr.

Further, the smoothing reactor L stores the energy of the DC power supply V2 in the same manner as in mode A.

(Mode F)

The direction of the current in the switching device S2 reverses in accordance with a decrease in the current in the resonant reactor Lr.

(Mode G)

The switching devices H1 and H4 are ON, whereas the switch SW1 is OFF. Therefore, when the current in the resonant reactor Lr further decreases and reaches zero, the diode D1 goes into reverse conduction, and a current flows in the resonant reactor Lr in a direction opposite to the direction of the current in mode F.

(Mode H)

When the diode D1 achieves reverse recovery, the current in the resonant reactor Lr, which is stored during a reverse conduction of the diode D1, causes the diodes DH2 and DH3 to conduct and flows in the diodes DH2 and DH3, resonant capacitor Cr, winding N1, and switching devices H1 and H4. In this instance, an electrical charge is stored in the resonant capacitor Cr to generate a voltage in the direction of increasing the current in the resonant reactor Lr. Therefore, the current in the resonant reactor Lr gradually increases.

The operation performed in mode H is symmetrical to the operation performed in mode A. Subsequently, the bidirectional DC-DC converter performs symmetrical operations in modes B to G, and then reverts to mode A. As such operations can be readily understood, no further detailed description will be given here.

During mode A (H), the diodes DH2 (DH1) and DH3 (DH4) achieve reverse recovery. However, when MOSFET body diodes or other diodes having relatively slow reverse recovery characteristics are used as the diodes DH1-DH4, they may fail to achieve reverse recovery during mode A (H). Even if the diodes DH2 and DH3 do not achieve reverse recovery during mode A, the subsequent operation is the same as described above as far as reverse recovery is achieved during mode B. If reverse recovery is still not achieved during mode B, the bidirectional DC-DC converter proceeds to operate in mode C as soon as reverse recovery is achieved. However, if the bidirectional DC-DC converter switches from a mode B operation to a mode C operation with a delay, the output power may increase. In such an instance, the diodes DH2 and DH3 should be allowed to achieve reverse recovery before the end of a mode B period for the purpose of adjusting the output power to a desired value with ease. As such being the case, a later-described method of connecting an additional capacitance component in parallel with the diode D1 can be used.

If, in mode A (H), a capacitance component is connected in parallel with the diode D1, a current flows to charge the capacitance component after reverse recovery is achieved by the diode D1. Also during a period in which such a charging current flows, the resonant reactor Lr stores the current. If, for instance, a capacitor is connected in parallel with the diode D1, it is possible to increase the current in the resonant reactor Lr in mode A (H). An increase in the current in the resonant reactor Lr will facilitate the reverse recovery of the diodes DH2 (DH1) and DH3 (DH4).

However, if a large current flows in the resonant reactor Lr in mode A (H), it is likely that the switching devices S1 and S2 may fail to achieve zero-voltage switching when they turn ON. If, in mode A, the current in the resonant reactor Lr, that is, the current in the winding N1, is large, the current in the winding N21 and switching device S1 is larger than the current in the winding N22 and switching device S2 because the windings N1, N21 and N22 are magnetically coupled. In mode B, the current interrupted by the switching device S2 is the charging current for the clamp capacitor Cc. Therefore, if the interrupted current is decreased, the charging current for the clamp capacitor Cc is decreased in modes B and C. Consequently, the current discharged from the clamp capacitor Cc in mode D is also decreased. The reason is that, in mode E, the switching device S4 interrupts the current discharged from the clamp capacitor Cc to divert the interrupted current to the diode DS2, thereby achieving zero-voltage switching when the switching device S2 turns ON.

In view of the above circumstances, the upper limit for the ON time ratio of the switching devices S1 and S2 can be varied in accordance with an input voltage, that is, the voltage of the DC power supply V2, to make it easy for the switching devices S1 and S2 to achieve zero-voltage switching when they turn ON even if the current in the resonant reactor Lr is relatively large in mode A (H). Increasing the ON time ratio of the switching devices S1 and S2 not only increases the output power but also increases the voltage of the clamp capacitor Cc. An increase in the voltage of the clamp capacitor Cc may break down the switching devices S1-S4 because the voltage of the clamp capacitor Cc is applied to the switching devices S1-S4. Therefore, an upper limit is imposed on the ON time ratio of the switching devices S1 and S2. If the output power is insufficient even when the ON time ratio is at the upper limit, desired output power is obtained by lengthening the mode B period while the ON time ratio is at the upper limit. In this instance, the output power is adjusted by varying the length of the mode B period. If sufficient output power is obtained even when the mode B period is reduced to zero, that is, the switching devices H2 and H3 are turned OFF in mode C at substantially the same time as the switching device S2 is turned OFF in mode B, the output power may be adjusted by varying the ON time ratio of the switching devices S1 and S2 while the length of the mode B period is fixed, for instance, at zero.

However, if the mode B period is lengthened in order to obtain sufficient output power, it is likely that the switching devices S1 and S2 may fail to achieve zero-voltage switching when they turn ON. In mode B, the voltage developed across the winding N1 is substantially entirely applied to the resonant reactor Lr. Therefore, the current in the resonant reactor Lr rapidly increases. Consequently, the charging current for the clamp capacitor Cc rapidly decreases to reduce the quantity of electrical charge in modes B and C. Thus, the current discharged from the clamp capacitor Cc in mode D also decreases. The reason is that, in mode E, the switching device S4 interrupts the current discharged from the clamp capacitor Cc to divert the interrupted current to the diode DS2, thereby achieving zero-voltage switching when the switching device S2 turns ON.

In a situation where desired output power is obtained by keeping the ON time ratio of the switching devices S1 and S2 at an upper limit and changing the length of the mode B period for output power adjustment purposes as described earlier, desired output power can also be obtained by raising the upper limit for the ON time ratio to shorten the mode B period. In this situation, therefore, it is likely that the switching devices S1 and S2 may achieve zero-voltage switching when they turn ON. In such an instance, the breakdown of the switching devices S1-S4, which may result from an increase in the voltage of the clamp capacitor Cc, can be avoided by raising the upper limit for the ON time ratio in accordance with a decrease in the input voltage, that is, the voltage of the DC power supply V2. The reason is that when the ON time ratio is fixed, the voltage of the clamp capacitor Cc is substantially proportional to the input voltage, that is, the voltage of the DC power supply V2.

As described above, even if the current in the resonant reactor Lr is relatively increased in mode A (H) for the purpose of facilitating the reverse recovery of the diodes DH1-DH4, turning ON the switching devices S1 and S2 is likely to achieve zero-voltage switching when the upper limit for the ON time ratio of the switching devices S1 and S2 is varied in accordance with the input voltage, that is, the voltage of the DC power supply V2.

The greatest feature of the bidirectional DC-DC converter according to the second embodiment is that it maintains the switch SW1 in the ON state during forward power transmission and in the OFF state during backward power transmission as described earlier. This ensures that even if a high-voltage MOSFET body diode or other device exhibiting relatively slow reverse recovery characteristics is used as the diodes DH1-DH4 during backward power transmission, the diode D1, which exhibits relatively fast reverse recovery characteristics, prevents a reverse electrical power flow from the DC power supply V1 and smoothing capacitor C1 to the diodes DH1-DH4, thereby providing efficient backward power transmission. This makes it possible to achieve backward power transmission with high efficiency even when a high-voltage MOSFET and its body diode are used as the switching devices H1-H4 and diodes DH1-DH4.

The other features of the bidirectional DC-DC converter according to the second embodiment are the same as those of the first embodiment and will not redundantly be described in detail except that it should be noted that the switching devices H1-H4 and diodes DH1-DH4 of the bidirectional DC-DC converter according to the second embodiment correspond to the switching/rectifying device for the switching circuit 11 of the bidirectional DC-DC converter according to the first embodiment.

Further, it is assumed that the second embodiment uses the combination of a voltage-type full-bridge circuit and a current-type center tap circuit. However, the use of the combination of a voltage-type center tap circuit, a half-bridge circuit, a current-type full-bridge circuit, and a current doubler circuit will also provide the same configuration and effect as the second embodiment.

Third Embodiment

Figure 5:
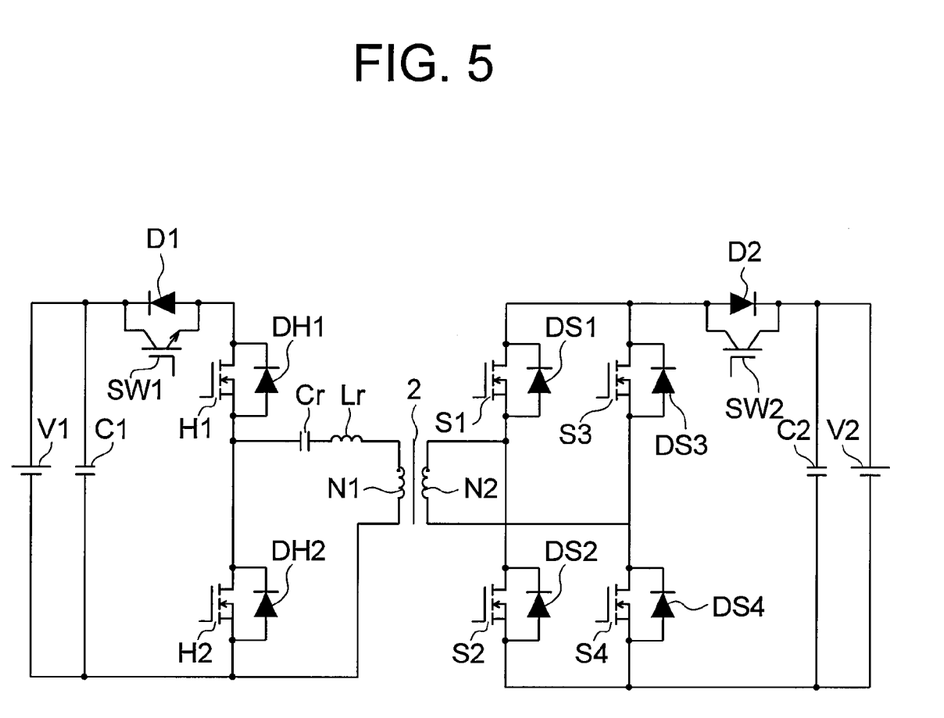
FIG. 5 is a schematic circuit diagram of a bidirectional DC-DC converter according to a third embodiment of the present invention.

FIG. 5 is a schematic circuit diagram of a bidirectional DC-DC converter according to a third embodiment of the present invention. The bidirectional DC-DC converter transfers electrical power between a DC power supply V1 and a DC power supply V2, which are connected to opposite ends of the bidirectional DC-DC converter.

Referring to FIG. 5, a smoothing capacitor C1 is connected to the DC power supply V1, whereas a smoothing capacitor C2 is connected to the DC power supply V2. Switching devices H1 and H2 are connected in series with a first switching leg. The first switching leg is connected to the smoothing capacitor C1 through a diode D1. The connection of this diode D1 is oriented so that electrical power flows from the first switching leg to the DC power supply V1 and does not flow from the DC power supply V1 to the first switching leg. A switch SW1 is connected in parallel with the diode D1. A winding N1, a resonant reactor Lr, and a resonant capacitor Cr are connected in series across the switching device H2.

Switching devices S1 and S2 are connected in series with a twenty-first switching leg. The twenty-first switching leg is connected to the smoothing capacitor C2 through a diode D2. The connection of this diode D2 is oriented so that electrical power flows from the twenty-first switching leg to the DC power supply V2 and does not flow from the DC power supply V2 to the twenty-first switching leg. A switch SW2 is connected in parallel with the diode D2. Switching devices S3, S4 are connected in series with a twenty-second switching leg. The twenty-second switching leg is connected in parallel with the twenty-first switching leg. A winding N2 is connected between a series connection point of the switching devices S1 and S2 and a series connection point of the switching devices S3 and S4. A transformer 2 magnetically couples the winding N1 to the winding N2.

Antiparallel diodes DH1, DH2, and DS1-DS4 are connected to the switching devices H1, H2, and S1-S4, respectively. When MOSFETs are used as these switching devices, MOSFET body diodes can be used as the antiparallel diodes.

An operation performed by the bidirectional DC-DC converter according to the third embodiment will now be described. During forward power transmission, the switch SW1 is maintained in the ON state with the switch SW2 maintained in the OFF state. The switching devices H1 and H2 are turned ON/OFF complementarily so that an alternating resonant current flows to the winding N1 through the resonant capacitor Cr and resonant reactor Lr. The diodes DS1-DS4 rectify a current induced in the winding N2 so that electrical power is supplied to the DC power supply V2 through the diode D2.

In this instance, even if devices exhibiting relatively slow reverse recovery characteristics are used as the diodes DS1-DS4, the diode D2, which exhibits relatively fast reverse recovery characteristics, prevents a reverse electrical power flow from the DC power supply V2 and smoothing capacitor C2 to the diodes DS1-DS4, thereby achieving forward power transmission with high efficiency. It means that efficient forward power transmission can be achieved even when, for instance, a high-voltage MOSFET and its body diode are used as the switching devices S1-S4 and diodes DS1-DS4.

During backward power transmission, on the other hand, the switch SW2 is maintained in the ON state with the switch SW1 maintained in the OFF state. The switching devices S1 and S2 are turned ON/OFF complementarily. In addition, the switching devices S4 and S3 are turned ON/OFF in synchronism with the switching devices S1 and S2 so that an alternating resonant current flows to the winding N2. A current induced in the winding N1 passes through the resonant capacitor Cr and resonant reactor Lr and is rectified by the diodes DH1 and DH2 so that electrical power is supplied to the DC power supply V1 through the diode D1.

In this instance, even if devices exhibiting relatively slow reverse recovery characteristics are used as the diodes DH1 and DH2, the diode D1, which exhibits relatively fast reverse recovery characteristics, prevents a reverse electrical power flow from the DC power supply V1 and smoothing capacitor C1 to the diodes DH1 and DH2, thereby achieving backward power transmission with high efficiency. It means that efficient backward power transmission can be achieved even when, for instance, a high-voltage MOSFET and its body diode are used as the switching devices H1 and H2 and diodes DH1 and DH2.

In general, diodes tend to exhibit poor reverse recovery characteristics when their dielectric strength is high. However, the third embodiment makes it possible to achieve bidirectional power conversion with high efficiency because it prevents a reverse electrical power flow from the DC power supplies V1 and V2 even when the voltages of both the DC power supply V1 and DC power supply V2 are relatively high and all the dielectric strengths of the diodes DH1, DH2, and DS1-DS4 are relatively high.

Effects produced by the diodes D1 and D2, and switches SW1 and SW2 will not be described in detail because they are the same as described in connection with the first and second embodiments.

It is assumed that the third embodiment uses the combination of a single-ended push-pull circuit and a full-bridge circuit. However, the combination of a half-bridge circuit and a center tap circuit may also be used.

As described above, the present invention produces the effects described in this document when a switch equipped with an antiparallel diode is inserted between a smoothing capacitor and a switching circuit, which are included in a voltage-type circuit of an isolated bidirectional DC-DC converter. It is therefore obvious that the present invention can be applied to a variety of isolated bidirectional DC-DC converters having a voltage-type circuit.

As described above, the present invention is applicable to all bidirectional DC-DC converters having an isolation function.

This application claims priority from Japanese Patent Application 2008-224231, filed Sep. 2, 2008, which is incorporated herein by reference in its entirety.

What is claimed is:

1. A bidirectional DC-DC converter comprising:
   a first smoothing capacitor which is connected between a first DC power supply and a first switching circuit and connected in parallel between the first DC power supply and DC terminals of the first switching circuit;
   a second smoothing capacitor which is connected in parallel with a second DC power supply and connected between DC terminals of a second switching circuit;
   a primary winding which is connected between AC terminals of the first switching circuit;
   a secondary winding which is connected between AC terminals of the second switching circuit;
   a transformer which magnetically couples the primary winding to the secondary winding;
   control means which controls the first and the second switching circuits so as to transfer electrical power between the first and the second DC power supplies;
   a first diode which is inserted in series, in a direction to prevent the electrical power from flowing from the first smoothing capacitor into the first switching circuit, between the first smoothing capacitor and the DC terminals of the first switching circuit to ensure that a cathode faces a positive electrode of the first DC power supply; and
   a first switch which is connected in parallel with the first diode;
wherein the control means is configured to turn on the first switch when supplying electrical power from the first DC power supply to the second DC power supply and is configured to turn off the first switch when supplying electrical power from the second DC power supply to the first DC power supply.

2. The bidirectional DC-DC converter according to claim 1, further comprising:
a resonant reactor which is inserted in series with the primary winding and/or the secondary winding.

3. The bidirectional DC-DC converter according to claim 1, further comprising:
a resonant capacitor which is inserted in series with the primary winding and/or the secondary winding.

4. The bidirectional DC-DC converter according to claim 1,
wherein the first switching circuit includes:
a first switching leg, which is connected in series with a first and a second switching device; and
a second switching leg, which is connected in series with a third and a fourth switching device and connected in parallel with the first switching leg,
wherein both ends of the first switching leg are a pair of DC terminals, and
wherein a series connection point between the first and the second switching devices and a series connection point between the third and the fourth switching devices are a pair of AC terminals.

5. The bidirectional DC-DC converter according to claim 4, wherein the third and the fourth switching devices are replaced with a first capacitor and a second capacitor, respectively.

6. The bidirectional DC-DC converter according to claim 1,
wherein: the primary winding includes a connection between one end of a first primary winding and one end of a second primary winding;
the first switching circuit includes a first and a second switching device;
the other end of the first primary winding is connected to one end of the first switching device;
the other end of the second primary winding is connected to one end of the second switching device;
the other end of the first switching device is connected to the other end of the second switching device; and
a connection point between the first and the second switching devices and a connection point between the first and the second primary windings are a pair of DC terminals.

7. The bidirectional DC-DC converter according to claim 1,
wherein the second switching circuit includes:
a smoothing reactor;
a third switching leg which is connected in series with a fifth and a sixth switching device; and
a fourth switching leg which is connected in series with a seventh and an eighth switching device and connected in parallel with the third switching leg,
wherein one end of the smoothing reactor is connected to one end of the third switching leg,
wherein the other end of the smoothing reactor and the other end of the third switching leg are a pair of DC terminals, and
wherein a series connection point between the fifth and the sixth switching devices and a series connection point between the seventh and the eighth switching devices are a pair of AC terminals.

8. The bidirectional DC-DC converter according to claim 1,
wherein: the secondary winding includes a connection between one end of a first secondary winding and one end of a second secondary winding;
the second switching circuit includes a smoothing reactor, a fifth switching device, and a sixth switching device;
the other end of the first secondary winding is connected to one end of the fifth switching device;
the other end of the second secondary winding is connected to one end of the sixth switching device;
the other end of the fifth switching device is connected to the other end of the sixth switching device;
one end of the smoothing reactor is connected to a connection point between the first and the second secondary windings; and
the other end of the smoothing reactor and a connection point between the fifth and the sixth switching devices are a pair of DC terminals.

9. The bidirectional DC-DC converter according to claim 1,
wherein the second switching circuit includes:
a connection between one end of a first smoothing reactor and one end of a second smoothing reactor; and
a connection between one end of a fifth switching device and one end of a sixth switching device,
wherein the other end of the fifth switching device is connected to the other end of the first smoothing reactor,
wherein the other end of the sixth switching device is connected to the other end of the second smoothing reactor,
wherein the other end of the fifth switching device and the other end of the sixth switching device are a pair of AC terminals, and
wherein a connection point between the first and the second smoothing reactors and a connection point between the fifth and the sixth switching devices are a pair of DC terminals.

10. The bidirectional DC-DC converter according to claim 1, further comprising:
a second diode which is inserted in series between the second DC power supply, the second smoothing capacitor, and the DC terminals of the second switching circuit to ensure that a cathode faces a positive electrode of the second DC power supply; and
a second switch which is connected in parallel with the second diode,
wherein the control means turns on the second switch when supplying electrical power from the second DC power supply to the first DC power supply and turns off the second switch when supplying electrical power from the first DC power supply to the second DC power supply.

11. The bidirectional DC-DC converter according to claim 10,
wherein the second switching circuit includes:
a third switching leg which is connected in series with a fifth and a sixth switching device; and
a fourth switching leg which is connected in series with a seventh and an eighth switching device and connected in parallel with the third switching leg,
wherein both ends of the third switching leg are a pair of DC terminals, and
wherein a series connection point between the fifth and the sixth switching devices and a series connection point between the seventh and the eighth switching devices are a pair of AC terminals.

12. The bidirectional DC-DC converter according to claim 11, wherein the seventh and the eighth switching devices are replaced with a third capacitor and a fourth capacitor, respectively.

13. The bidirectional DC-DC converter according to claim 10,
wherein: the secondary winding includes a connection between one end of a first secondary winding and one end of a second secondary winding;
the second switching circuit includes a fifth and a sixth switching device;
the other end of the first secondary winding is connected to one end of the fifth switching device;
the other end of the second secondary winding is connected to one end of the sixth switching device;
the other end of the fifth switching device is connected to the other end of the sixth switching device; and
a connection point between the fifth and the sixth switching devices and a connection point between the first and the second secondary windings are a pair of DC terminals.

14. The bidirectional DC-DC converter according to claim 10, wherein the first and the second switches are electromagnetic relays.

15. The bidirectional DC-DC converter according to claim 7, wherein the first to the eighth switching devices are MOSFETs.

16. The bidirectional DC-DC converter according to claim 10, wherein the first and the second diodes exhibit faster reverse recovery characteristics than body diodes and/or antiparallel diodes of the first to the eighth switching devices.

17. A method for controlling a bidirectional DC-DC converter comprising:
a first switching circuit which is connected in parallel with a first DC power supply;
a second switching circuit which is connected in parallel with a second DC power supply;
a first smoothing capacitor which is connected in parallel with the first DC power supply and the first switching circuit and formed between the first DC power supply and the first switching circuit;
a primary winding which is connected between AC terminals of the first switching circuit;
a secondary winding which is connected between AC terminals of the second switching circuit;
a transformer which magnetically couples the primary winding to the secondary winding; and
control means for controlling the first and the second switching circuits so as to transfer electrical power between the first and the second DC power supplies,
the method comprising the steps of:
inserting a first rectifying device in series between the first smoothing capacitor and DC terminals of the first switching circuit to ensure that a direction of rectification is oriented toward a positive electrode of the first DC power supply, in a direction to prevent the electrical power from flowing from the first smoothing capacitor into the first switching circuit; and
connecting a first switch in parallel with the first rectifying device,
wherein the control means turns on the first switch when supplying electrical power from the first DC power supply to the second DC power supply and turns off the first switch when supplying electrical power from the second DC power supply to the first DC power supply.

* * * * *